(12) United States Patent
Han et al.

(10) Patent No.: US 9,175,116 B2
(45) Date of Patent: Nov. 3, 2015

(54) POLYMERIC WATER REPELLENT MATERIAL

(75) Inventors: Yang-Kyoo Han, Seoul (KR); Je-Gwon Lee, Seoul (KR); Su-Hwa Kim, Seongnam-si (KR)

(73) Assignees: LG CHEM, LTD., Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 133 days.

(21) Appl. No.: 13/992,146

(22) PCT Filed: Jun. 15, 2012

(86) PCT No.: PCT/KR2012/004758
§ 371 (c)(1),
(2), (4) Date: Jun. 6, 2013

(87) PCT Pub. No.: WO2012/177022
PCT Pub. Date: Dec. 27, 2012

(65) Prior Publication Data
US 2013/0266790 A1    Oct. 10, 2013

(30) Foreign Application Priority Data

Jun. 24, 2011 (KR) .................. 10-2011-0061929
Jun. 15, 2012 (KR) .................. 10-2012-0064360

(51) Int. Cl.
*C08F 122/38* (2006.01)
*C08F 120/56* (2006.01)
*C08F 220/56* (2006.01)
*C08F 222/10* (2006.01)

(52) U.S. Cl.
CPC ............. *C08F 122/38* (2013.01); *C08F 120/56* (2013.01); *C08F 220/56* (2013.01); *C08F 222/1006* (2013.01); *Y10T 428/298* (2015.01)

(58) Field of Classification Search
None
See application file for complete search history.

(56) References Cited

U.S. PATENT DOCUMENTS 5,260,131 A      11/1993   Fukui et al.
2013/0216472 A1*  8/2013   Han et al. ................... 423/648.1

FOREIGN PATENT DOCUMENTS

| CN | 103201417 A | 7/2013 |
|---|---|---|
| EP | 2267048 | 12/2010 |
| KR | 10-2003-0049208 A | 6/2003 |
| KR | 2005056288 * | 6/2005 |
| KR | 10-0749965 B1 | 8/2007 |
| KR | 10-2009-0051068 A | 5/2009 |
| KR | 1111133 * | 2/2012 |

OTHER PUBLICATIONS

Kim, H.W.; Cho, B.K.; Lee, M.K.; Han, Y.K. "Synthesis of new thermo-responsive poly(acrylamides) and their sol-gel phase transition behaviors in aromatic solvents" Polymer preprints. 2005.*

(Continued)

*Primary Examiner* — Mike M Dollinger
*Assistant Examiner* — Christina Wales
(74) *Attorney, Agent, or Firm* — Dentons US LLP

(57) ABSTRACT

The present invention relates to a polymeric water repellent material including novel acrylamide polymer, which can be used in various field because it demonstrates controllable and excellent water repellency together with water adhesiveness. The polymeric water repellent material comprises an acrylamide polymer including at least one repeating unit.

12 Claims, 8 Drawing Sheets

(56) References Cited

OTHER PUBLICATIONS

K. D. Branham, Water-soluble polymers: 59. Investigation of the effects of polymer microstructure on the associative behaviour of amphiphilic terpolymers of acrylamide, acrylic acid and N-[(4-decyl)phenyl]acrylamide; Polymer, vol. 35, No. 20, 1994, 4429-4436.

A.B.D. Cassie and S. Baxter, Wettability of Porous Surfaces; Trans. Faraday Soc., vol. 40, 1944, 546-551.

"Synthesis of New Block Copolymers from $n$-Butyl Acrylate and DPAA by RAFT Polymerization and Their Properties"; J. K. Lee; MS Thesis; Hanyang University; Feb. 29, 2008.

Cho, J., et al.: "Preparation of Porous Crosslinked Copolymer Particles from DPAA and Vinyl Monomers by a Suspension Polymerization and Their Applications as Polymeric Reagents for Hydrogenations", Abstract for the Annual Meeting of the Polymer Society of Korea 2008.

J. K. Lee, et al.: "Synthesis of Novel DPAA Based Block Copolymers by RAFT Polymerizations and Their Morphology Control", Abstract for Annual Meeting of the Polymer Society of Korea 2009.

* cited by examiner

POLYMERIC WATER REPELLENT MATERIAL

This application is a National Stage Entry of International Application No. PCT/KR2012/004758, filed Jun. 15, 2012, and claims the benefit of Korean Application Nos. 10-2011-0061929 filed on Jun. 24, 2011, and 10-2012-0064360, filed Jun. 15, 2012, all of which are hereby incorporated by reference in their entirety for all purposes as if fully set forth herein.

TECHNICAL FIELD

The present invention relates to novel polymeric water repellent materials. More specifically, the present invention relates to a polymeric water repellent material comprising a novel acrylamide polymer and thus demonstrating controllable and excellent water repellent properties together with water adhesion properties and being available for many fields.

BACKGROUND OF THE ART

A surface having a water contact angle equal to or higher than 90° may be generally classified as a hydrophobic or water-repellent surface. The water contact angle on a solid surface may be defined, for example, as a contact angle appearing when a water drop of 3-20 mg is dropped onto the solid surface.

Products having such a water repellent surface may prevent water from penetrating and also show a self-cleaning property because they allow only a small contact area for foreign materials such as dirt or bacteria being placed thereon, which may therefore not be easily attached thereto but readily removed therefrom.

Thanks to such properties, such water repellent products have been widely utilized or under review for their application as water repellent fibers, water repellent coatings, stain-resistant coatings, and anti-corrosion coatings in the fiber industry, the civil engineering and construction industry, the shipbuilding industry, or other mechanical or electronic industries.

The water repellent products are frequently required to have a certain degree of water repellency controlled depending on their application or uses. However, for the water repellent products hitherto produced, controlling their water repellency often turns out to be difficult and thus different water repellent products should be designed for each and every application or use.

Meanwhile, some recent researches have been focused on products having water adhesion properties in conjunction with water repellency. Such types of products may prevent water from penetrating to their solid surface while retaining water thereon and also collect a substantial amount of water on a certain surface area thanks to their water adhesiveness. Based on such characteristics, the products demonstrating both of water repellency and water adhesiveness have been reviewed for their possibilities to be utilized as a water capturing agent or a water capturing device in a region suffering from water shortage.

According to prior arts, however, realization of such products with aforementioned characteristics has inevitably entailed forming an additional fine pattern (e.g., a fine pattern of polydopamine) that demonstrates hydrophilicity and water adhesiveness on a water repellent surface of a substrate such as an anodized aluminum oxide. Practically, such methods are too complicate to be industrially employed, and thus studies regarding the products having both of water repellency and water adhesiveness and industrial applications thereof have faced with major difficulties up to date.

DETAILED DESCRIPTION OF THE INVENTION

Technical Objectives

Thus, the present invention provides polymeric water repellent materials comprising a novel acrylamide polymer and thus demonstrating controllable and excellent water repellency together with water adhesiveness.

Technical Solutions

The present invention provides a polymeric water repellent material comprising a novel acrylamide polymer comprising at least one repeating unit of Chemical Formula 1:

[Chemical Formula 1]

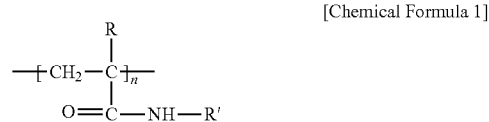

in Chemical Formula 1,
n is an integer of 15 to 1800,
R is hydrogen or methyl,
R' is X,

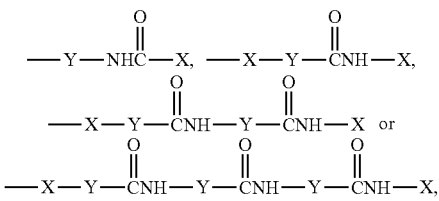

X is —Z—R",
Y is an alkylene of $C_1$ to $C_{10}$,
Z is an arylene of $C_6$ to $C_{20}$, and
R" is a linear or branched hydrocarbon of $C_{10}$ to $C_{20}$, or a linear or branched perfluorohydrocarbon of $C_{10}$ to $C_{20}$.

Hereinafter, the polymeric water repellent material according to specific embodiments of the present invention will be explained in detail.

According to an embodiment of the invention, a polymeric water repellent material comprising an acrylamide polymer including at least one repeating unit of Chemical Formula 1 is provided:

[Chemical Formula 1]

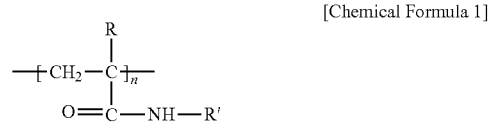

in Chemical Formula 1,
n is an integer of 15 to 1800,
R is hydrogen or methyl,
R' is X,

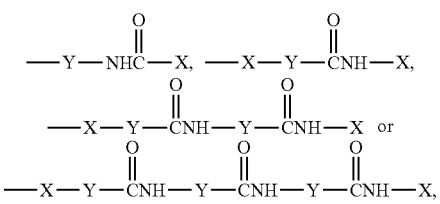

X is —Z—R",

Y is an alkylene of $C_1$ to $C_{10}$,

Z is an arylene of $C_6$ to $C_{20}$, and

R" is a linear or branched hydrocarbon of $C_{10}$ to $C_{20}$, or a linear or branched perfluorohydrocarbon of $C_{10}$ to $C_{20}$.

To complete the present invention, the present inventors have discovered that in a solid state, a sort of acrylamide polymers may have a surface showing excellent water repellency together with outstanding water adhesiveness. As can be evidenced by the following examples, such acrylamide polymers show excellent water-repellent properties that are also adjustable to a desired level by changing their molecular weight, their type, their size, or the like. In other words, it has been found that the acrylamide polymer may demonstrate water repellency being controlled to have a desired level ranging from hydrophobicity or water repellency with a contact angle of at least 90° to super water-repellency with a contact angle of at least 150° when a water drop is dropped on the surface, and controlling the water repellency may be easily achieved, as well. Accordingly, the acrylamide polymer and the polymeric water repellent material comprising the same may be suitable for use in a water repellent product in various fields and uses.

Surprisingly, the present inventors have also discovered that the acrylamide polymers may demonstrate outstanding water adhesiveness together with the aforementioned water repellent properties. Thus, such polymers and the polymeric water repellent materials comprising the same may show surface characteristics of water repellency and water adhesiveness at the same time with no need for forming an additional fine pattern. Therefore, such polymers and the polymeric water repellent materials are expected to find their applications in a range of fields as a suitable product available for a water capturing agent, a water capturing device, or the like.

Without being bound by any theory, it is believed that the water repellency and the water adhesiveness of the acrylamide polymer and the polymeric water repellent materials are basically derived from the characteristics of the acrylamide polymer. The acrylamide polymer, which is produced by conducting a radical polymerization in a special manner (e.g., a RAFT polymerization) with a certain type of acrylamide monomers (hereinafter, a monomer of Chemical Formula 2), may exhibit mesoporosity comprising many mesopores without any additional chemical treatment due to the following reasons:

The acrylamide monomer being used in the production of such acrylamide polymers has a chemical structure wherein a non-polar aliphatic hydrocarbon long-chain branch (having at least 10 carbon atoms) capable of being self-assembled, an arylene group triggering interaction between π-π orbitals, and an amide group capable of bringing forth an intra- or intermolecular hydrogen bonding are introduced. The self-assembling behavior of the aliphatic long-chain hydrocarbons, the π-π interaction of the arylene groups, and the intra-molecular hydrogen bonding between the amide groups enable the monomer to form a regular monoclinic crystal structure in a solid state, e.g., a monoclinic monocrystal.

When a special type of radical polymerization is conducted with such monomers, the monomer molecules may therefore undergo polymerization while being well-oriented, and this ensures that each monomer molecule may be orderly arranged in a polymer chain. More specifically, the polymerization reaction makes the well-oriented monomer molecules be linked together, forming one polymer chain (e.g., one building block of a polymer), and such polymer building blocks may gather to form a orderly arranged polymer. Thanks to the polymer building blocks that are orderly arranged in the polymer, the acrylamide polymer may therefore contain a lot of uniformly-sized mesopores without any further treatment after polymerization. In addition, the acrylamide polymer may show crystallinity based on the same reasons.

The foregoing characteristics allow water droplets to be formed on the mesopores, being translated into water repellent properties, and the presence of the long chain branch of the aliphatic hydrocarbon having hydrophobicity in itself may bring additional benefits to water repellency, as well. Therefore, such polymers and the polymeric water repellent material comprising the same may have outstanding water repellency. Moreover, the level of water repellency may be easily controlled by changing the length of the long chain branch, the molecular weight of the polymer, or the degree of the mesoporosity.

The acrylamide polymer may also demonstrate superb water adhesiveness in conjunction with the aforementioned outstanding water repellency because they comprise plenty of intra-molecular hydrogen-bondings. The hydrogen bonding may have interaction with water, allowing the same to be attached on the surface of the water repellent materials comprising the polymer, and as a result, the polymer and the water repellent materials have a higher level of water adhesiveness at the same time. Likewise, one may easily control the level of water adhesiveness by controlling the number of the hydrogen bondings included in the polymer and the molecular weight thereof.

Accordingly, the polymers and the polymeric water repellent materials may be properly used as a water repellent product in a range of applications and uses, and their characteristics simultaneously demonstrating water repellency and water adhesiveness hold great potential for new application.

More detailed explanations as to the acrylamide polymers and then polymeric water repellent materials will be presented hereinafter.

In the acrylamide polymer being included as a main component in the polymeric water repellent materials, Z may comprise any arylene having 6 to 20 carbon atoms. More specifically, examples of the arylene group include

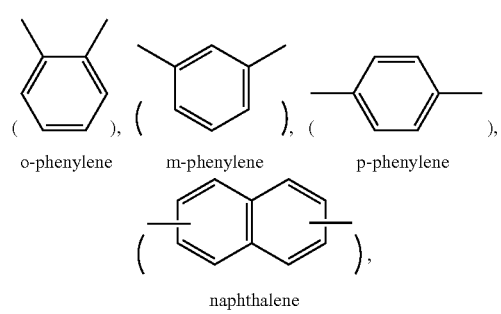

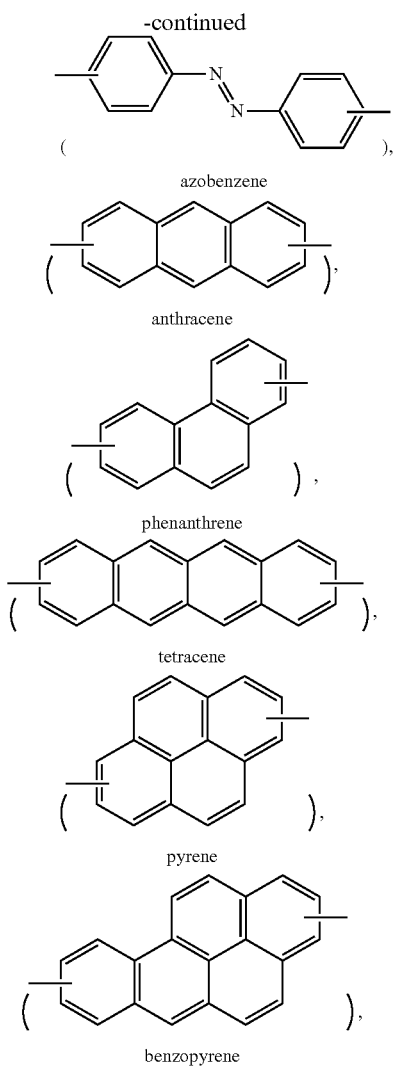

and the like, and other various arylene group may also be utilized.

In addition, R″ is a linear or branched aliphatic hydrocarbon being substituted at the o-, m-, or p-position of the aromatic rings in Z, and the hydrocarbon has a long chain length of at least 10 carbon atoms, more specifically, 10 to 20 carbon atoms. In addition, the hydrocarbon may be unsubstituted or substituted with fluorine and it may be a linear or branched perfluorohydrocarbon of $C_{10}$ to $C_{20}$. Due to the substitution with fluorine, the polymer and the water repellent material comprising the same may have a more enhanced level of water repellency.

Because the repeating unit of Chemical Formula 1 and the monomer of Chemical Formula 2 as described below include such a long chain hydrocarbon and the arylene, the mesoporosity of the polymers resulting from their self-assembling behavior may become more remarkable, and the presence of the hydrophobic long chain branch enables the polymer and the water repellent materials to show a more enhanced level of water repellency.

The polymer may be either a homo-polymer consisting of one type of the repeating unit of Chemical Formula 1, or a copolymer consisting of at least two repeating units.

The acrylamide polymer may also comprise a number of mesopores having a diameter of about 2.0 to 10.0 nm or about 2.0 to 6.0 nm in a solid state. In this regard, the "diameter" of the pore may be defined as the length of the longest line among the straight lines connecting two different points on a circle, an oval, or a polygonal of the cross-section of each pore. As mentioned above, when the polymers include plenty of uniform mesopores having a diameter within such a range, the water repellent materials comprising the same may show excellent water repellency that can reach a level of super water-repellent properties.

The polymer has a number average molecular weight of about 5,000 to about 500,000, or a number average molecular weight of about 7,000 to about 300,000. In addition, the polymer may have crystallinity with a melting point ($T_m$) of about 200° C. to 300° C., or about 220° C. to 280° C. As the polymers have a melting temperature and a molecular weight falling in the aforementioned ranges, they may exhibit outstanding thermal stability resulting from the high melting temperature and the high molecular weight and also be easily prepared as electrospun fibers by using a electrospinning process without losing any of the excellent properties thereof.

Moreover, by adjusting the molecular weight within the foregoing range, one may easily control the water repellency of the polymers and the water repellent materials, making them demonstrate a desired level of water repellency. By way of an example, increasing the molecular weight of the polymer leads to an increase in the number of the hydrogen bondings in a molecule, making it possible for the polymer to have a more enhanced level of water adhesiveness and a lower level of water repellency or hydrophobicity. By contrast, decreasing the molecular weight may enhance water repellency.

Besides, it has been found that the acrylamide polymers may have crystallinity with a melting point falling in the aforementioned range. Accordingly, they may show mesoporosity and crystallinity distinguished from any similar polymers known in the art. Thanks to such mesoporosity and the like, the polymers and the water repellent materials comprising the same may have excellent water repellent properties. The melting point and the crystallinity of the polymers may be determined through a structural analysis of a solid polymer by using a small angle X-ray scattering (SAXS) and an wide angle X-ray scattering (WAXS), and via a thermal analysis for the phase transition temperature of the polymer conducted by differential scanning calorimetry (DSC).

It has been found that when the polymers are subjected to a heat treatment at a temperature of at least about 200° C. but below their melting point, for example, at a temperature of between about 220° C. and 240° C., increasing the temperature of the heat treatment may lead to a decrease in the diameter of the pore on the polymer. By way of an example, as the temperature of the heat treatment increase, the pore diameter may decrease by about 0.4 to 0.7 nm, more specifically, by about 0.5 to 0.6 nm.

It has been also found that the diameter of the pores on the polymer increases as the length of the chemical structure of R′ bonded to the amide (—CO—NH—) group in the repeating unit of Chemical Formula 1 or the length of the aliphatic hydrocarbon bonded at its end (e.g., the carbon number of the hydrocarbon corresponding to R″) increases. For example, as the carbon number increases from 12 to 16, the diameter of the mesopores may increase by about 0.1 to 1.0 nm, more specifically by about 0.2 to 0.7 nm. As the chemical structure of Z being included in the R′ has different aromatic structures from phenylene to naphthalene or anthracene, the diameter of the pore may increase.

Presumably, the changes in the pore diameter result from the change in the three-dimensional (or crystalline) structure of the mesopores of the polymers caused either by the heat treatment or by the changes in the chemical structure of R' linked to the amide group or the carbon number of R" bonded at its end, and this may be substantiated by the results of DSC analysis made in the following examples.

As such, in the acrylamide polymers, controlling the pore size may be easily accomplished by means of carrying out a heat treatment, changing the chemical structure introduced into the amide group of the repeating unit, or controlling the length of the hydrocarbon, and thus one can easily control the pore size in the water repellent materials comprising the acrylamide polymers. Accordingly, since the mesoporosity of the water repellent material may be easily controlled, adjusting the degree of water repellency would become easy, as well. Therefore, the water repellent materials can be readily prepared to have a desired level of water repellency, and thus can be used properly as a water repellent product in different applications and uses.

The acrylamide polymers and the polymeric water repellent material may be in the form of a polymer itself, for example polymeric solid powers, but it may also be shaped as a film comprising the acrylamide polymer. The film has a surface typified in demonstrating water adhesiveness together with the controllable and excellent water repellency, and thus can be advantageously utilized as a water repellent product in many fields.

The film may be prepared in accordance with any conventional methods of producing a polymer film, wherein the acrylamide polymer is dissolved in a solvent and dried in a cast (such as in a solvent casting method), or the polymer is melted and molded into a shape, or the solution of the polymer is spin-coated onto a substrate. In the film thus prepared, the acrylamide polymer and the water repellent materials comprising the same may demonstrate outstanding water repellency, and the film may be prepared with exceptional ease, as well.

The film may have a thickness of about 100 nm to 300 μm, or about 120 nm to 270 μm. The thinner the film is, the more enhanced level of water repellency the film may have. Moreover, one may easily control the water repellent properties in order for the film to show a desired level of water repellency simply by adjusting the film thickness, and the water repellent material thus obtained with such a controlled water repellency may be desirably utilized as a water repellent product in different uses.

The polymeric water repellent material comprising the acrylamide polymer may be electrospun fibers including the polymer. Like the polymer or the film, the electrospun fibers may have mesoporosity comprising plenty of uniformly-sized micropores on the surface. Furthermore, the electrospinning process of the polymer may cause even larger pores to be formed on the surface of the electrospun fibers, and thereby the mesoporosity may be further expanded.

As a result, the water repellent materials comprising the electrospun fibers may exhibit exceptional water repellency that can reach a level of super water-repellent properties.

The electrospun fibers may have a fiber diameter of about 200 nm to 10 μm, or about 250 nm to 7 μm. The term "(fiber) diameter of an electrospun fiber" may be defined as the length of the longest line among the straight lines connecting two different points on a circle, an oval, or a polygon that makes the cross-section of each fiber. The diameter of the electrospun fiber may be changed by controlling the conditions of an electrospinning process or the types of the repeating units of the acrylamide polymer, or the molecular weight thereof, and the electrospun fibers may have a different size such as a diameter within the foregoing range. By controlling their size, the electrospun fibers and the polymeric water repellent materials comprising the same may demonstrate a controlled level of water repellency and can be desirably utilized as a water repellent product and the like in different fields.

The electrospun fiber may comprise a plurality of pores formed on its surface having a diameter of about 2 nm to 500 nm, or about 10 to 450 nm, or about 50 to 400 nm, or about 100 to 350 nm, and the plurality of pores are uniformly distributed on the fiber surface.

As described above, the mesoporosity of the electrospun fibers basically results from the mesoporosity of the acrylamide polymer and may be further expanded in the electrospinning process such that the fibers may uniformly have plenty of pores with the aforementioned size. The expanded mesoporosity of the electrospun fiber makes the water repellent materials including the same demonstrate ever more enhanced water repellency.

In addition, the electrospun fiber may become a crosslinked electrospun fiber as surface-crosslinked with an acrylate crosslinker having at least two functional groups. In this regard, the acrylate crosslinker may comprise bisphenol A ethoxylate diacrylate of Chemical Formula 4 or other different multifunctional acrylate crosslinkers:

[Chemical Formula 4]

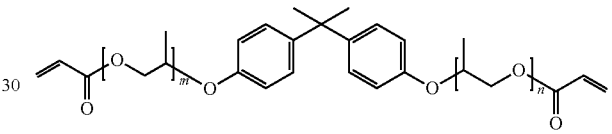

wherein m+n is an integer of 4 to 20.

The surface-crosslinking makes the surface of the crosslinked electrospun fiber more hydrophobic, more water-repellent, and more densified. As a result, the water repellent material comprising such fibers may demonstrate more outstanding water repellency.

The foregoing acrylamide polymer and the electrospun fiber including the same may be prepared by the production method as set forth hereinbelow.

First, the acrylamide polymer may be prepared by a method comprising the steps of carrying out a radical polymerization (e.g., a RAFT polymerization) with reactants including at least one monomer of Chemical Formula 2 in the presence of a radical initiator and optionally a reverse addition fragmentation transfer (RAFT) reagent; and precipitating the polymerization product in a non-solvent:

[Chemical Formula 2]

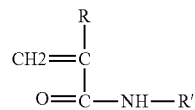

In Chemical Formula 2, R and R' are the same as defined in Chemical Formula 1.

As such, the acrylamide monomer having a certain structure of Chemical Formula 2 can be subjected to a radical polymerization (e.g., RAFT polymerization) under particular conditions in the particular manner and precipitated in a non-solvent to easily provide the acrylamide polymer with the aforementioned regularity and crystallinity. Sufficient explanations as to the reasons why the polymers prepared in such manners would have the regularity and the crystallinity have already been presented, and thus further explanation will now be omitted. To the conclusion, a relatively simple radical polymerization process alone makes it possible to prepare the acrylamide polymer without any additional chemical treatment.

In the foregoing production method, the polymerization step may be preceded by the steps of forming a reaction solution comprising the radical initiator, the RAFT reagent, and the reactants; putting the reaction solution into a polymerization ample and removing oxygen therefrom via a freezing and thawing method; and sealing the ample. As such, each reactant, the initiator, and the like are placed in an oxygen-removed polymerization ample before the polymerization being triggered, and thus the RAFT polymerization, which is known as a type of a living radical polymerization, may conducted more appropriately, enabling one to obtain the acrylamide polymer at a higher conversion rate.

In the production method, the precipitation step may be followed by the additional steps of dissolving the precipitated polymers in an organic solvent; and re-precipitating the solution of the polymers by using a non-solvent. With such an additional re-precipitation, crystalline acrylamide polymers can be more preferably obtained.

In the production method, one may also use any acrylamide monomer having a structure of Chemical formula 2 as a monomer. Specific examples thereof include N-(p-dodecyl) phenyl acrylamide (DOPAM), N-(p-tetradecyl)phenyl acrylamide, (TEPAM), N-(p-hexadecyl)phenyl acrylamide (HEPAM), N-(p-dodecyl)naphthyl acrylamide (DONAM), N-(p-tetradecyl)naphthyl acrylamide (TENAM), N-(p-hexadecyl)naphthyl acrylamide (HENAM), N-(p-dodecyl) azobenzenyl acrylamide, (DOAZAM), N-(p-tetradecyl) azobenzenyl acrylamide (TEAZAM), N-(p-hexadecyl) azobenzenyl acrylamide (HEAZAM), and N-[4-(3-(5-(4-dodecyl-phenylcarbamoyl)pentyl-carbamoyl)-propyl) phenyl acrylamide (DOPPPAM), all of which may be substituted with at least one fluorine. Needless to say, it is also possible to use at least two monomers selected from the foregoing ones.

The monomer may be in the form of a monoclinic crystal structure, e.g., a monoclinic monocrystal as evidenced by the following examples. Since the polymers are prepared through a RAFT polymerization with a monomer as obtained in the form of monoclinic monocrystal, each monomer molecule is more orderly arranged in the polymer chains and the well-oriented monomer molecules are linked to each other, making it possible to advantageously produce a polymer having mesoporosity and crystallinity.

In order to obtain the monomer in the form of a monocrystal, one may add an agent for crystal growth to the monomers thus synthesized in a polar and/or non-polar solvent so as to grow them in the form of a monocrystal. At this time, the growth rate of the monocrystal may be determined depending on the composition and the ratio of the polar solvent and the non-polar solvent being used, the time and the temperature of the crystal growth, the chemical structure and the concentration of the agent for crystal growth being added.

In addition, a radical initiator, a RAFT reagent, a monomer, and the like may be dissolved in an organic solvent to provide a reaction solution, in which the RAFT polymerization may occur. As the organic solvent, it is possible to use at least one non-polar solvent selected from the group consisting of n-hexane, cyclohexane, benzene, toluene, chlorobenzene, dichlorobenzene, methylene chloride, and 1,2-dichloroethane, or at least one polar solvent selected from the group consisting of acetone, chloroform, tetrahydrofuran (THF), dioxane, monoglyme, diglyme, dimethylformamide (DMF), dimethylsulfoxide (DMSO), and dimethylacetamide (DMAC). It is also possible to use a mixed solvent of the non-polar and polar solvents. Moreover, the aforementioned organic solvent may be used in the re-precipitation step to dissolve the polymerization product.

In the reaction solution, the monomer may be dissolved at a concentration of about 3.0 to 50% by weight, or about 5.0 to 40% by weight with respect to the organic solvent. The reaction solution with the monomer being dissolved at such a concentration may efficiently undergo a subsequent polymerization.

In addition, as the radical initiator that is used together with the monomer, one may use any initiator known in the art to be available for the radical polymerization without particular limitations. Specific examples of the radical initiator include azobisisobutyronitrile (AIBN), 2,2'-azobis-(2,4-dimethylvaleronitrile), benzoyl peroxide (BPO), and di-t-butyl peroxide (DTBP), and it is possible to use at least two compounds selected from the foregoing ones.

Further, as the RAFT reagent, one may use a thermal decomposition initiator such as S-1-dodecyl-S'-($\alpha,\alpha'$-dimethyl-$\alpha''$-acetic acid)trithiocarbonate, cyanoisopropyl dithiobenzoate, cumyl dithiobenzoate, cumyl phenylthioacetate, 1-phenylethyl-1-phenyldithioacetate, or 4-cyano-4-(thiobenzoylthio)-N-succinimide valerate, and it is possible to use a mixture of at least two compounds selected from the foregoing ones.

The radical initiator and the RAFT reagent may be used at a ratio of about 0.001 to 5.0% by weight with respect to the weight of the monomer.

In the above production method, the radical polymerization may proceed at a reaction temperature of about 60 to 140° C. In addition, the radical polymerization may be carried out for about 30 to 200 hours, and more specifically about 50 to 170 hours.

In the precipitation or the re-precipitation processes of the production method, one may also use any solvent not dissolving the polymerization product or the acrylamide polymers as the non-solvent. Examples of the non-solvent include a polar solvent such as methanol, ethanol, n-propanol, iso-propanol, or ethylene glycol, or a non-polar solvent such as n-hexane, cyclohexane, or normal heptanes. Needless to say, it is possible to use a mixed solvent of at least two compounds selected from the foregoing ones. Through the precipitation and the re-precipitation processes with using such a non-solvent, one may obtain more easily a polymer having mesoporosity and the crystallinity at high purity.

The electrospun fiber comprising the polymer may be prepared in a method comprising the steps of dissolving the acrylamide polymer comprising at least one repeating unit of Chemical Formula 1 in an organic solvent; and electro-spinning the polymer solution.

In this method, the acrylamide polymer prepared by the aforementioned method is first dissolved in an organic solvent to provide a polymer solution for the electrospinning. As the organic solvent for dissolving the polymer, it is possible to use any of various organic solvents capable of dissolving the polymer. By way of an example, one may use at least one non-polar solvent selected from the group consisting of n-hexane, cyclohexane, benzene, toluene, chlorobenzene, dichlorobenzene, methylene chloride, and 1,2-dichloroethane, or at least one polar solvent selected from the group consisting of acetone, chloroform, tetrahydrofuran (THF), dioxane, monoglyme, diglyme, dimethylformamide (DMF), dimethylsulfoxide (DMSO), and dimethylacetamide (DMAC). It is also possible to use a mixed solvent of at least two selected from the foregoing ones or a mixed solvent of the non-polar and polar solvents. With using such a mixed solvent, the amount of the polar solvent in a total solvent may range from about 60 to 90% by weight. In the polymer solution, the polymer may be dissolved in an organic solvent at a concentration of about 10 to 40% by weight. However, the types and the concentration of the solvent may be selected depending on the specific chemical structures and the molecular weight of the acrylamide polymer.

After the formation of the polymer solution as described above, it may be subjected to an electrospinning process to provide electrospun fibers. Various characteristics such as chemical properties or a physical shape of the electrospun fibers may be affected by all the conditions such as a molecular structure, a morphological structure, and a molecular weight of the polymer as used, and a type and a concentration of the organic solvent as employed, a spinning speed of a polymer solution (mL/min), a voltage applied to an electrospinning machine, a diameter of a spinning needle, a distance between a needle and a fiber collector, and the like.

In this respect, for the purpose of producing electrospun fibers with a more uniform diameter, the electrospinning is preferably conducted under a voltage applied at about 10 to 30 kilovolt. In addition, the electrospinning may carried out in an electrospinning machine including a nozzle with its inner diameter between about 0.1 and 0.7 mm, with a distance between the nozzle and the collector being from 10 to 30 cm.

The spinning speed of the electrospinning may vary with the types of the polymers, the molecular weight thereof, and the type or the concentration of the solvent, but in order to produce electrospun fibers having the aforementioned crystallinity, no bead formation, and a uniform surface, the electrospinning is preferably carried out at a spinning speed of about 5 to 20 mL/min.

In order to prepare the surface-crosslinked electrospun fiber, the electrospun fibers as obtained by the foregoing method can be further subjected to a surface-crosslinking treatment with using an acrylate crosslinker having at least two functional groups. More specifically, after the electrospinning process, the electrospun fibers is subjected to a heat treatment in the presence of a crosslinker and an initiator (e.g., the aforementioned radical initiator such as BPO and the like) to achieve their surface-crosslinking. The crosslinker and the initiator may be mixed with the acrylamide polymer prior to the electrospinning, and the resulting mixed solution is subjected to an electrospinning process and then a heat treatment to produce a crosslinked electrospun fiber.

The temperature for the heat-treatment for the surface-crosslinking may range from about 80 to 120° C., and the heat treatment can be carried out for about 30 minutes to 5 hours to cause a surface-crosslinking.

In this way, it is possible to obtain crosslinked electrospun fibers that become further densified and more hydrophobic, showing more enhanced water repellency.

With the method as set forth in the above, one may obtain electrospun fibers having properties such as expanded mesoporosity, which can then be utilized to provide a water repellent material in accordance with an embodiment of the invention.

Further, the polymeric water repellent materials according to an embodiment of the invention can be produced by any typical method of producing a polymeric water repellent material except for comprising the acrylamide polymer as described above or the films or electrospun fibers including the same. Where appropriate, the polymeric water repellent materials may also include a variety of organic, inorganic, or polymeric water repellent substances or additive substances that had been previously used in the art in addition to the foregoing acrylamide polymers.

The polymeric water repellent materials may be in the form of, for example, a film or an electrospun fiber, and has excellent water repellency such that a contact angle of about 90 to 170°, or about 110 to 160°, or 120 to 150° can be obtained when a water drop having a weight of about 3 to 20 mg, for example, about 3 to 5 mg, or about 10 to 20 mg is dropped onto the surface of the water repellent material.

As stated above, the polymer water repellent material may have a desired level of water repellency as controlled by adjusting the molecular weight of the acrylamide polymer, the carbon number of the long chain branch, the degree of mesoporosity, their forms such as a film or an electrospun fiber, whether to be surface-crosslinked or not, the size of the film or the fiber, or the like.

As such, because the polymeric water repellent materials demonstrate water repellency as controlled to a desired level, one can make better use of them as a water repellent product in various applications.

Besides, the polymeric water repellent material has been found to have a critical surface tension ($\gamma c$) of about 10 dyne/cm or less, or about 5 to 9 dyne/cm, or about 6 to 7 dyne/cm, or about 6.1 to 6.5 dyne/cm, or about 6.2 to 6.4 dyne/cm. The critical surface tension is a type of unique properties of a material, meaning that the material can be wet only by a liquid having a surface tension lower than that. As the polymeric water repellent material has such a low critical surface tension, its surface would not really get wet by a liquid having a higher surface tension, for example, by water, indicating that the polymeric water repellent material has very good water repellency.

In addition, as supported by the following examples, the polymeric water repellent material may demonstrate superb water adhesiveness in conjunction with the outstanding water repellency. By way of an example, the polymeric water repellent material may show such a high level of water adhesiveness that a water drop having a weight of about 3 to 20 mg, for example, about 3 to 5 mg, or about 10 to 20 mg can be held on its surface for at least one second even when the water drop is dropped onto the surface of the water repellent material according to the aforementioned method for measuring the water repellency and then the resulting surface is inclined at an angle up to about 180° (e.g., at an angle of from 45° to 180°). With having both of water repellency and water adhesiveness, the polymeric water repellent materials of an embodiment of the invention are expected to be utilized diversely in new applications or uses including a water capturing agent or a water capturing device that can be used in a region suffering from water shortage.

Advantageous Effect of the Invention

According to the present invention as detailed in the above may be provided polymeric water repellent materials, which have excellent water repellency easily controllable to a suitable level for each application and may demonstrate superb water adhesiveness at the same time. Such exceptionally good properties of the polymeric water repellent materials are believed to result from the mesoporosity and the crystallinity that are unique to the novel acrylamide polymers.

Therefore, the polymeric water repellent materials of the present invention may be advantageously employed for water repellent products in various applications and uses, and expectedly, their applicability for other new fields would be expanded, as well.

EXAMPLES

Figure 1:
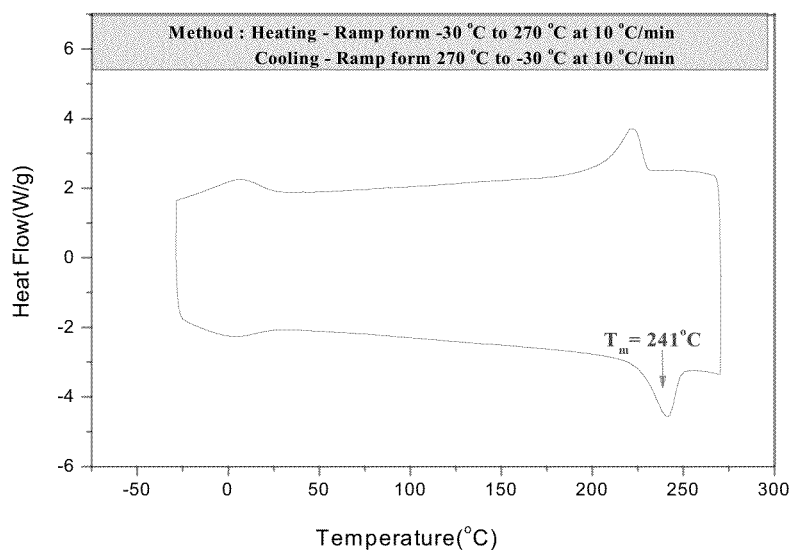
FIG. 1 illustrates a DSC thermal curve of the polymer prepared in Example 2.

Hereinafter, the actions and the effects of the invention will be explained in further detail with reference to specific examples of the invention. However, they are merely presented by way of an example of the present invention, the scope of which shall not be defined thereby.

Example 1

Synthesis of an Acrylamide Monomer and Determination of its Crystallinity—Synthesis of Paradodecyl Acrylamide (DOPAM) and the Preparation of its Monocrystal First, 12 g (0.046 mol) of paradodecyl aniline was dissolved in 100 mL of THF and then put into a 100 mL three-neck round bottom flask. To this solution was added dropwise through a funnel over 10 minutes an acid remover prepared by mixing imidazole and triethyl amine at an equivalent mole ratio (0.023 mol). Then, to the resulting solution was slowly added dropwise through a dropping funnel over 20 minutes under a nitrogen atmosphere a solution prepared by dissolving 3.8 mL (0.047 mol) of acryloyl chloride in 20 mL of THF. At this time, the reaction mixture cooled with ice so as to keep its temperature below 5° C. Thereafter, the reaction proceeded at 0° C. for 6 hours, and then at 25° C. for 9 hours. After the completion of the reaction, the resulting solution was filtered with a filtering paper to remove salt precipitates, and then the solvent was eliminated by using an evaporator. The obtained solids were dissolved in 100 mL of dichloromethane and put into a separating funnel together with 50 mL of an aqueous solution of 10% NaHCO$_3$ and shaken strongly to separate the aqueous solution layer and to remove the unreacted portion of acryloyl chloride. To the dichloromethane solution being separated was added 1.0 g of magnesium sulfate and the resulting mixture was stirred for 5 hours and filtered to remove a trace amount of water being dissolved in the solvent. The resulting dichloromethane solution was evaporated and then 100 mL of n-hexane was added thereto and stirred for 2 hours, and then was filtered to remove an unreacted portion of paradodecyl aniline remained in the solution. The solvent was removed from the resulting solution by using an evaporator to provide white solids of DOPAM (Yield: 95%). The chemical structure of DOPAM as synthesized was confirmed by a $^1$H nuclear magnetic resonance ($^1$H-NMR) spectrum, and the results are the same as follows:

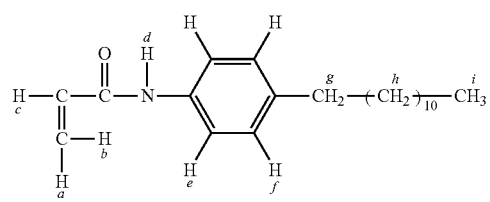

$^1$H-NMR (CDCl$_3$): e, δ 7.5 (d, 2H); d, δ 7.2 (s, 1H); f, δ 7.15 (d, 2H); b, δ 6.4 (d, 1H); c, δ6.2 (q, 1H); b, δ 5.8 (d, 1H); g, δ 2.6 (t, 2H); h, δ 1.25-1.35 (m, 20H); i, δ 0.935 (t, 3H).

Also, DOPAM as synthesized (T$_m$=101° C.) was purified again by being subjected to recrystallization with ethanol three times. The pure DOPAM as purified was put into THF and then a few drops of a non-polar solvent was added thereto, and the resulting mixture was kept below −10° C. for a certain period of time to grow monocrystals of the monomer. At this time, the growing rate of the monocrystal was found to depend on the composition and the ratio of the polar and non-polar solvents as used, the time and the temperature for crystal growth, the chemical structure and the concentration of the agent for crystal growth as added.

X-ray diffractometry (XRD) was used to analyze the crystal structure of the monocrystal obtained in Example 1, providing the crystallographic data of the monocrystal as set forth in Table 1. Based on such crystallographic data, the monocrystal of the monomer of Example 1 was confirmed to have a monoclinic crystal structure.

TABLE 1

Crystallographic data for the monocrystal of the monomer obtained from Example 1

| | |
|---|---|
| Empirical formula | C$_{21}$H$_{33}$N$_1$O$_1$ |
| Formula weight | 315.48 |
| Temperature [K] | 293(2) K |
| Wavelength [Å] | 0.71073 |
| Crystal system, space group | Monoclinic, P2$_1$/c |
| a [Å] | 4.7055(13) |
| b [Å] | 43.315(16) |
| c [Å] | 9.4150(19) |
| β [°] | 95.158(19) |
| Volume [Å$^3$] | 1911.2(10) |
| d$_{calcd}$ [gcm$^{-3}$] | 1.096 |
| μ [mm$^{-1}$] | 0.066 |
| F(000) | 696 |
| Crystal size [mm] | 0.55 × 0.30 × 0.25 |
| θ range [°] | 1.88-26.33 |
| Data/parameters | 1845/213 |
| GOF on F$^2$ | 1.111 |
| R1, wR2 [I > 2σ(I)] | 0.0975, 0.2551 |
| Largest diff. peak and hole [e · Å$^{-3}$] | 0.358 and −0.343 |

Examples 2-5

Synthesis of Novel Acrylamide Polymers

Example 2

Poly(DOPAM) Preparation-1

1.0 g of a DOPAM monomer in the form of a rod-like crystal obtained from Example 1 was dissolved in 6.3 mL of THF and then was put into a 10 mL Schenk flask together with 0.87 mg of AIBN (as a radical initiator) and 1.75 mg of cyanoisopropyl ditiobenzoate (as a RAFT reagent) dissolved in 6.3 mL of THF. The resulting mixture was stirred for 30 minutes under a nitrogen atmosphere to remove oxygen from the solution, and then the flask was placed in a silicone oil bath at 70° C. to carry out a RAFT polymerization for 72 hours. After the polymerization reaction, the reaction solution was precipitated in 200 mL of methanol, and then the resulting precipitate was filtered to provide orange solids. The obtained solids were dissolved again in 8 mL of THF and re-precipitated in an excess amount of methanol. The pale yellow solids thus obtained were dried in a vacuum oven for 24 hours to produce a pure homopolymer, Poly(DOPAM)-1 of Chemical Formula 3 as follows:

[Chemical Formula 3]

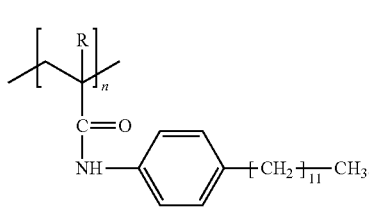

The polymerization conversion rate and the number average molecular weight were 48% and 14,900, respectively. The obtained polymer had a very narrow molecular weight distribution of 1.25 and a melting temperature ($T_m$) of 241° C.

Example 3

Poly(DOPAM) Preparation-2

A pure Poly(DOPAM)-2 was obtained in the same manner as set forth in Example 2 except for using 1.5 g of a rod-like crystalline DOPAM monomer obtained from Example 1, 7.8 mL of benzene, 2.63 mg of cyanoisopopyl ditiobenzoate (the RAFT reagent), and 1.3 mg of AIBN. The polymerization conversion rate and the number average molecular weight of the polymer were 66% and 35,000, respectively. The polymer had a relatively narrow molecular weight distribution of 1.39, and a melting temperature ($T_m$) of 242° C.

Example 4

Poly(DOPAM) Preparation-3

1 g of a DOPAM monomer in the form of a rod-like crystal obtained from Example 1 was put into a 20 mL ample together with 6.5 mL of a THF/benzene (30/70 v/v) mixed solvent and 10 mg of BPO, a radical initiator. Oxygen was removed from the resulting solution by using a freezing-thawing method and then the ample was sealed and subjected to a radical polymerization in an oven at 80° C. for 48 hours. After the polymerization reaction, the reaction solution was precipitated in 300 mL of methanol, and then the resulting precipitate was filtered to obtain pale yellow solids. The solids thus obtained were dissolved again in 10 mL of THF and re-precipitated in an excess amount of methanol. The solids thus obtained were dried in a vacuum oven over one day to produce a pale yellow homopolymer, Poly(DOPAM)-3. The polymerization conversion rate and the number average molecular weight were 94% and 99,000, respectively. The obtained polymer was found to have a molecular weight distribution of 3.2 and a melting temperature ($T_m$) of 242° C.

Example 5

Poly(DOPAM) Preparation-4

A pure Poly(DOPAM)-4 was obtained in the same manner as set forth in Example 4 except for using 1 g of a rod-like crystalline DOPAM monomer obtained from Example 1, 6.5 mL of benzene, and 10 mg of BPO, the initiator, and setting the polymerization time as 72 hours. The polymerization conversion rate and the number average molecular weight were 97% and 115,000, respectively. The obtained polymer was found to have a molecular weight distribution of 3.4 and a melting temperature ($T_m$) of 242° C.

Experimental Example 1

Analysis of Thermal Characteristics and Mesoporosity of the Acrylamide Polymer (1) Analysis of Thermal Characteristics of the Polymer by DSC Phase transition behavior of Poly(DOPAM) obtained from Example 2 was investigated by using a DSC thermal analyzer, confirming that Poly(DOPAM) is a crystalline polymer having a melting temperature ($T_m$) of 241° C.

Referring to FIG. 1, it shows a DSC thermal curve illustrating a thermal phase transition temperature behavior of Poly(DOPAM)-1 as obtained in Example 2. Reference to FIG. 1 confirms that a mesoporous structure formed with the polymer chains of Poly(DOPAM) has a melting temperature ($T_m$) of 241° C. In addition, the melting temperature of the microcrystals formed by the aliphatic hydrocarbons introduced at the end of the repeating unit was found at about 5° C. Since the phase transition melting temperatures are shown at almost the same temperature region with a similar heat capacity in the heating or cooling curves, it is believed that the polymer chains of Poly(DOPAM) are oriented in a relatively stable manner to form a mesoporous structure. In addition, when the number average molecular weight of Poly(DOPAM) was above 8000, no big differences were found in the melting temperature.

(2) Structural Analysis of the Mesoporosity of the Polymer by TEM

Figure 2:
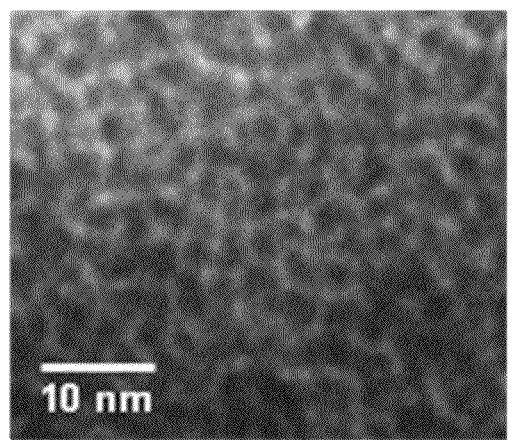
FIG. 2 shows a TEM image of a thin film comprising the polymer of Example 2.

A thin film comprising Poly(DOPAM)-1 of Example 2 was prepared and analyzed by using a transmission electron microscope (TEM). FIG. 2 shows its TEM image. In preparation of this thin film, powders of Poly(DOPAM)-1 were thermally treated at its melting temperature for 6 hours and quenched with liquid nitrogen. FIG. 2 shows the resulting TEM image, which was captured for such a thin film being cut in a thickness of 50 to 120 nm and subjected to vapor-deposition with $RuO_4$. Referring to FIG. 2, the black dots show portions wherein $RuO_4$ is deposited onto the benzene groups introduced into a polymer chain of Poly(DOPAM) constituting the backbone of the cylindrical structure, and it can be found that the black dots representing a pore size of about 3.5 nm are distributed relatively uniformly on the surface of the thin film. Such results confirm that the polymer of this example include plenty of uniformly-sized pores. Therefore, the polymer of the example is expected to demonstrate excellent water repellency based on such mesoporosity.

Examples 6 and 7

Preparation of a Water Repellent Film Comprising Novel Acrylamide Polymers-Film Preparation by Using a Teflon Mold Poly(DOPAM)-1 and Poly(DOPAM)-2 as synthesized in Examples 2 and 3 were dissolved in $CHCl_3$ to prepare a polymer solution with a concentration of 2-10 wt %. The polymer solution was put into a Teflon mold (3 cm×7 cm) and dried in the atmosphere for 24 hours, and in the vacuum oven for 24 hours to prepare a water repellent film. The film was made to have a thickness of 50 μm by controlling the concentration of the solution and the molecular weight of the polymer. The polymer obtained in Example 2 was employed to prepare the water repellent film of Example 6 while the polymer as obtained in Example 3 was employed to prepare the water repellent film of Example 7.

Examples 8-13

Production of the Electrospun Fibers from the Novel Acrylamide Polymers

Example 8

To prepare electrospun fibers with an electrospinning machine (ESR-200RD) from Korea NanoNC Co. Ltd., 1.0 g of Poly(DOPAM)-3 synthesized in Example 4 was dissolved in 5.1 mL of THF, and 5 mL of the resulting polymer solution was put into a syringe and subjected to electrospinning with using a 25 gauge stainless steel needle (diameter: 0.508 mm). In the electrospinning process, the applied voltage was 15 kV, the spinning speed was 15 μL/min, and the distance between the needle and the collector was 12 cm. The electrospun fibers thus obtained were found to have a uniform size with a diameter of 250 to 450 nm.

Example 9

Figure 3:
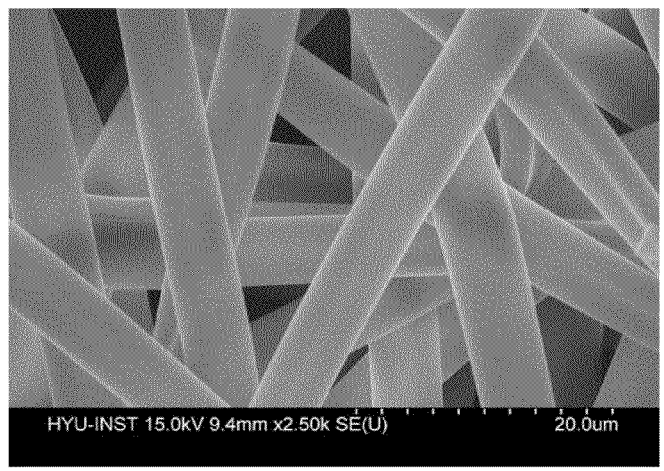
FIG. 3 shows a SEM image of the electrospun fibers of Example 9.

Electrospun fibers were prepared by the electrospinning carried out under the same conditions as set forth in Example 8, except for using 1.0 g of a novel mesoporous polymer, Poly(DOPAM)-4 being synthesized in Example 5, 2.9 mL of THF, and an applied voltage of 10 kV. It was found that the electrospun fibers thus obtained had a diameter of about 6 μm and uniform surfaces, and no bead was formed. The SEM image of the electrospun fibers are shown in FIG. 3.

Example 10

Electrospun fibers were prepared by the electrospinning carried out under the same conditions as set forth in Example 9, except for using an applied voltage of 15 kV. The electrospun fibers thus obtained were found to have a uniform size with a diameter of about 6 μm.

Example 11

Electrospun fibers were prepared by the electrospinning carried out under the same conditions as set forth in Example 9, except for using 3.4 mL of THF and an applied voltage of 15 kV. The electrospun fibers thus obtained were found to have a uniform size with a diameter of about 2 μm.

Example 12

Production of Crosslinked Electrospun Fibers

In preparation of electrospun fibers with an electrospinning machine (ESR-200RD) from Korea NanoNC Co. Ltd., 0.3 g of Poly(DOPAM)-4 as synthesized in Example 5 was dissolved in 0.87 mL of THF together with 33 mg of bisphenol A ethoxylate diacrylate (as a crosslinker), and 0.67 mg of BPO (as an initiator), and the resulting polymer solution was put into a 5 mL syringe and subjected to electrospinning with using a 25 gauge stainless steel needle (diameter: 0.508 mm). Speaking of the spinning conditions, the applied voltage was 10 kV, the spinning speed was 15 μL/min, and the distance between the needle and the collector was 12 cm. The electrospinning process produced novel crystalline mesoporous electrospun fibers having a diameter of 5 μm with no formation of a bead, and then the resulting fibers were heated in an oven at 90° C. for two hours to produce novel crosslinked electrospun fibers of Poly(DOPAM)-4.

Figure 4:
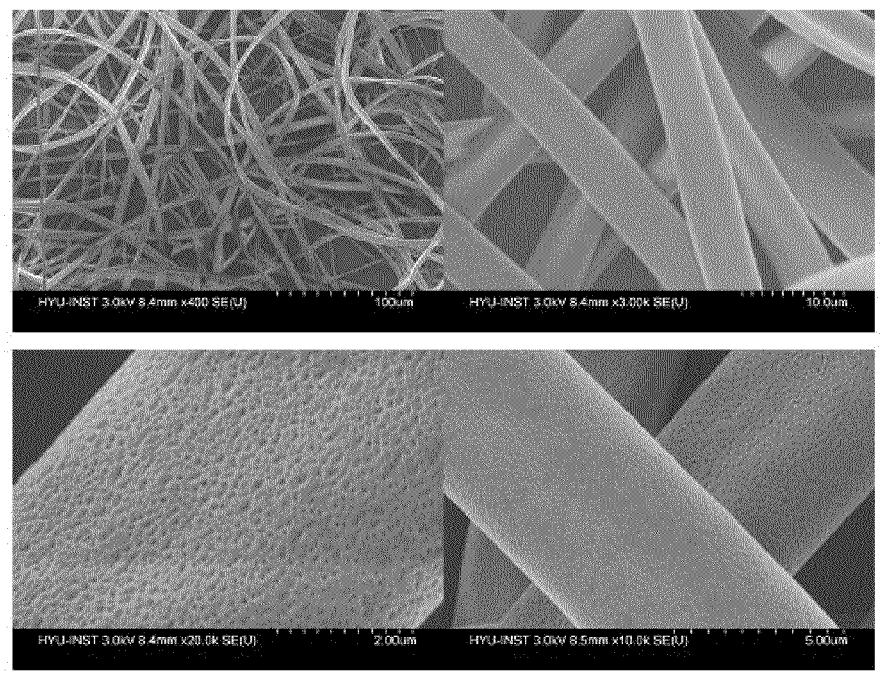
FIG. 4 shows a SEM image of the crosslinked electrospun fibers of Example 12.

The SEM image of the crosslinked electrospun fibers thus produced is shown in FIG. 4. With reference to FIG. 4, fine pores having a size of about 50 to 200 nm were three dimensionally distributed well on the surface of the crosslinked electrospun fibers like a sponge.

Example 13

Production of Crosslinked Electrospun Fibers

The electrospinning process and the subsequent crosslinking reaction were conducted under the same condition as set forth in Example 12, except for using 3.35 mg of BPO as an initiator to produce novel crosslinked electrospun fibers of Poly(DOPAM)-4.

Figure 5:
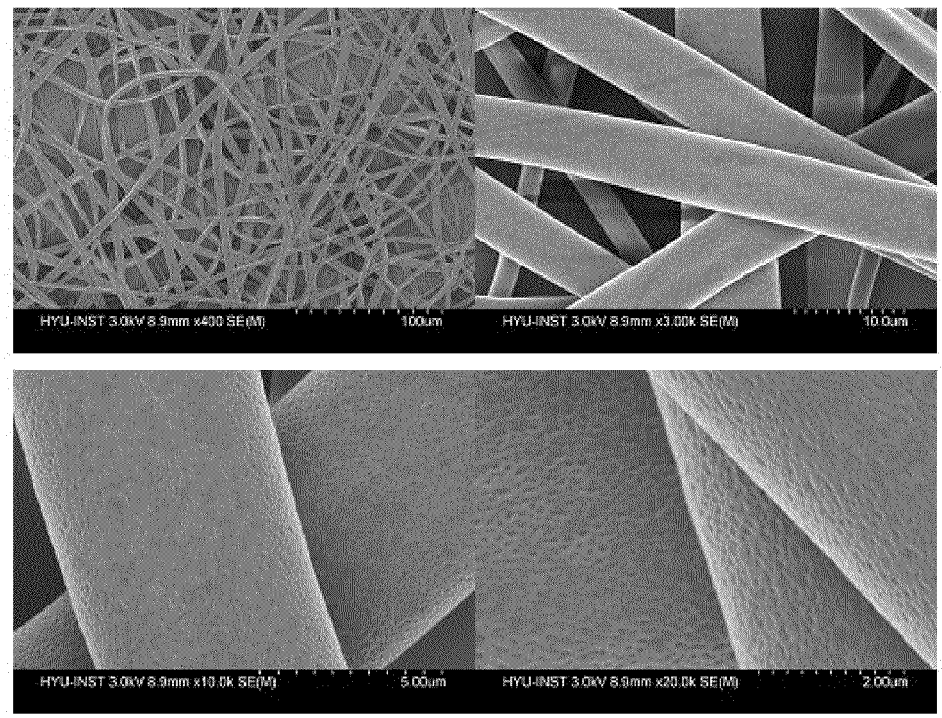
FIG. 5 shows a SEM image of the crosslinked electrospun fibers of Example 13.

The SEM image of the crosslinked electrospun fibers thus produced is shown in FIG. 5. The results show that fine pores having a size of about 100 to 200 nm were three-dimensionally distributed well on the surface of the crosslinked electrospun fibers like sponge.

Experimental Example 2

Evaluation of Water Repellency for the Films and the Electrospun Fibers Comprising Novel Acrylamide Polymers 1. Measurement of a Contact Angle on the Films For the films of Examples 6 and 7, the contact angles against water were measured with using a contact angle measuring device (model name: EasyDrop FM 40 from KRUSS Co. Ltd.). More specifically, a water drop having a weight of 20 mg was dropped onto the surface of a sample with using a micro-syringe and the image of the water drop was captured by a CCD camera, and then the contact angle was determined on a software by using a tangent method. As a result, the contact angles were measured to be 122.5° and 117.7°, respectively. The images of the water drops are shown in FIG. 6 and FIG. 7.

Figure 6:
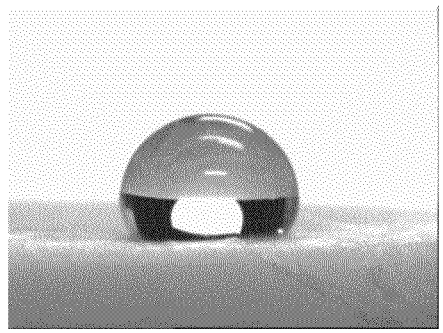
FIG. 6 and FIG. 7 show images of a water droplet captured by a CCD camera after a water droplet of 20 mg was dropped onto the film surface to measure a contact angle with using the films of Examples 6 and 7, respectively.
Figure 7:
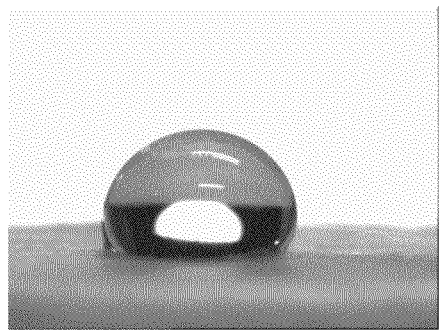

Reference to FIG. 6 and FIG. 7 reveals that the films of Examples 6 and 7 have excellent water repellency, which can be easily controlled by adjusting the molecular weight.

2. Measurement of a Contact Angle on the Electrospun Fibers

The same method as set forth in the method of measuring the contact angle on the films was employed to measure the contact angles of the electrospun fibers of Example 9 and the crosslinked electrospun fibers of Example 12 against water. For the electrospun fibers of Example 9, a water drop was dropped at a different weight of 3 mg, 10 mg, and 20 mg, respectively, and then each of contact angle was measured. For the crosslinked electrospun fibers of Example 12, the experiment was conducted with a water drop of 3 mg being dropped. The results of measuring the contact angles are the same as compiled in Table 2, and the images of the water drops are shown in FIGS. 8, 9, 10 and FIG. 11a.

TABLE 2

Figure 8:
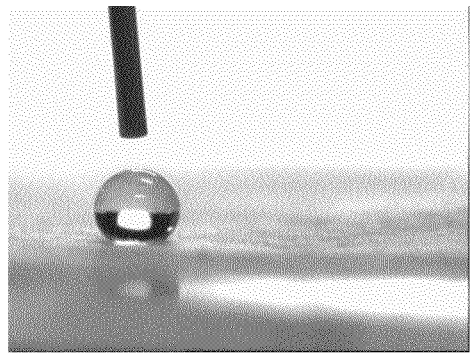
FIGS. 8-10 illustrates images of water droplets captured by a CCD camera after the water droplets of 3 mg, 10 mg, and 20 mg were dropped onto the fiber surface respectively in order to measure a contact angle with using the electrospun fibers of Example 9.
Figure 9:
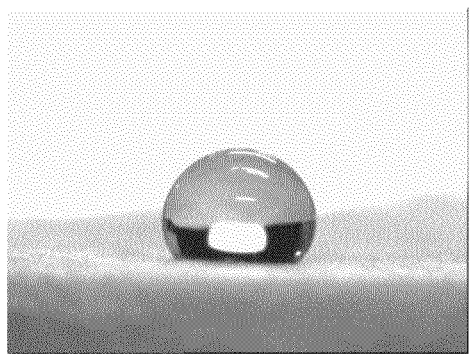
Figure 10:
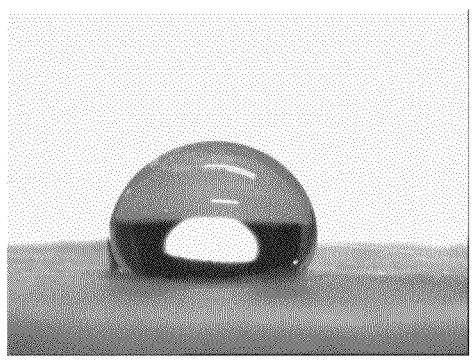
Figure 11A:
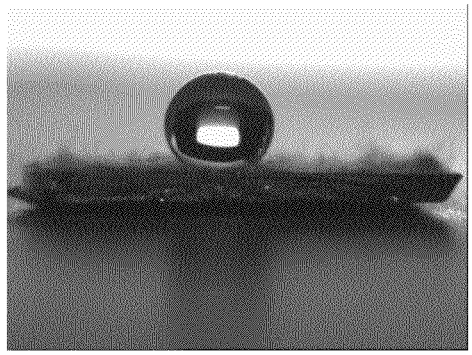
FIG. 11a shows an image of a water droplet captured by a CCD camera after a water droplet of 3 mg was dropped onto the surfaces of fibers in order to measure a contact angle with using the crosslinked electrospun fibers of Example 12.

| sample | amount of water | contact angle | image of water drop |
|---|---|---|---|
| Example 12 | 3 mg | 150° | FIG. 11a |
| Example 9 | 3 mg | 132.6° | FIG. 8 |
|  | 10 mg | 126° | FIG. 9 |
|  | 20 mg | 117.7° | FIG. 10 |

Reference to Table 2 and FIGS. 8-11a confirms that the electrospun fibers have excellent water repellency up to a level of super water repellency, and it was also found that controlling the water repellency may be easily accomplished depending on the presence of the surface-crosslinking and the like.

Figure 11B:
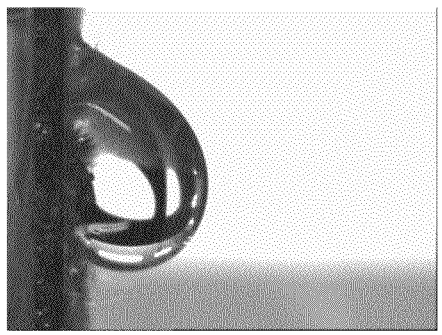
FIG. 11b and FIG. 11c show images of a water droplet after it was dropped onto the fibers and then the fibers were inclined at an angle of 90° and 180°, respectively.
Figure 11C:
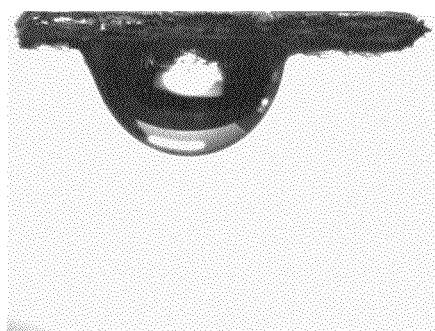

After the contact angle was measured for the fibers of Example 12, the sample of Example 12 was inclined at an angle of 90° and 180°, respectively, and then each image of the water drop was captured, respectively. The results are shown in FIG. 11b and FIG. 11c, respectively. Referring to FIG. 11b and FIG. 11c, the electrospun fibers of Example 12 are found to retain the water drops at their surface, indicating that they have excellent water adhesiveness.

3. Measurement of Critical Surface Tension of the Acrylamide Polymer Contained in the Film Type Water-Repellent Material In order to measure the critical surface tension of the polymers contained in Examples 6 and 7, the contact angles against methanol, acetic acid (of a different concentration, 10%, 40%, and 99.8%), glycerol, and water were measured in the same manner as the aforementioned methods. With the results thus obtained, the contact angle of the film against each solvent was plotted as a function of the surface tension (dyne/cm), from which a straight line was drawn with a minimum multiplication method and the critical surface tension was determined at the point where the contact angle became zero. These measurement results are shown in FIG. 12a and FIG. 12b, respectively.

Figure 12A:
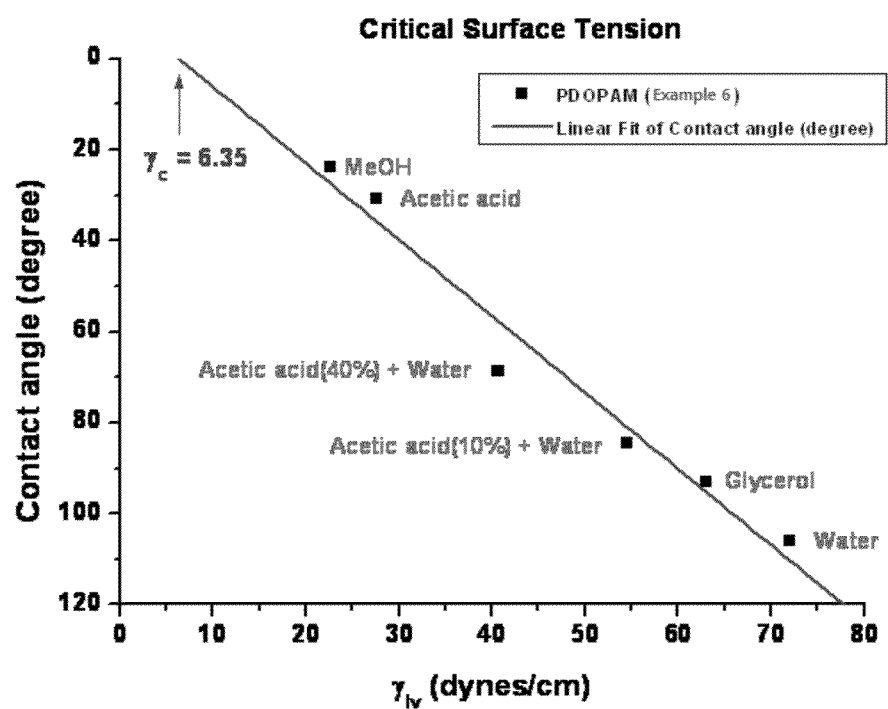
FIG. 12a and FIG. 12b show the results of measuring the critical surface tension for the polymers included in the films of Examples 6 and 7, respectively.
Figure 12B:
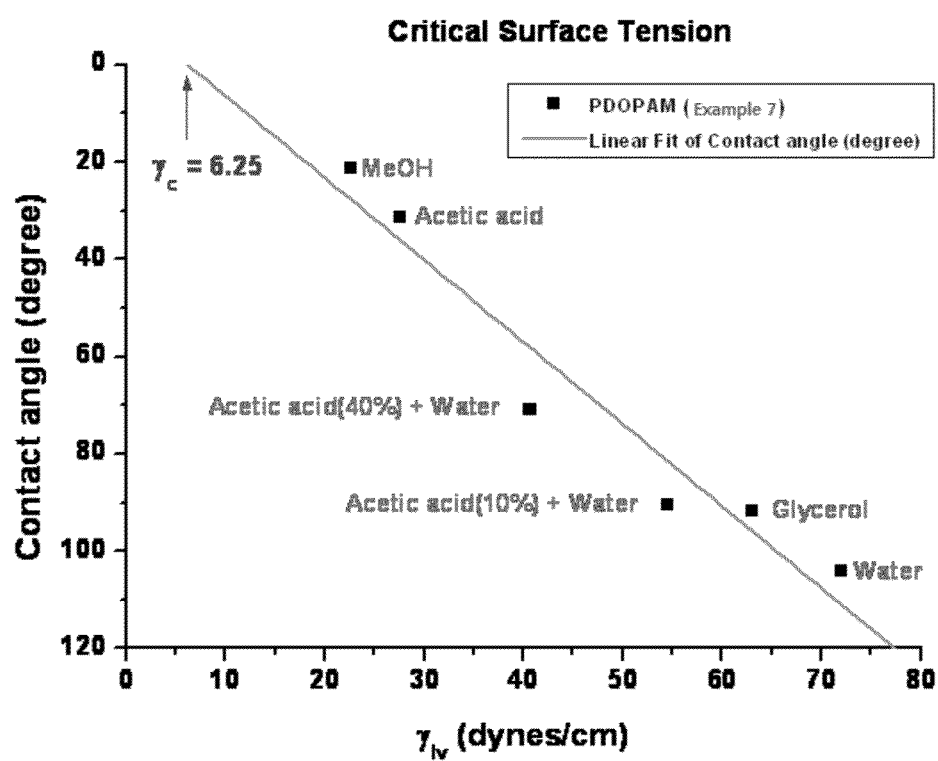

With reference to FIG. 12a and FIG. 12b, the polymers contained in the films of Examples 6 and 7 are found to have a low critical surface tension of 6.35 dyne/cm and 6.25 dyne/cm, respectively. Such critical surface tensions are compiled in Table 3 in comparison with the surface tension of other polymers as set forth in a reference book.

TABLE 3

| Surface Tension of Polymers (γ, dyne/cm at 20° C.)* | |
|---|---|
| Poly(ethylene) | 36 |
| branched | 35.3 |
| linear ($M_n$ = 67,000) | 35.7 |
| Poly(propylene) | 30 |
| Poly(styrene) | 40 |
| Poly(acrylamide) | 52.3 |
| Poly(acrylonitrile) | 50 |
| Poly(ethylene terephthalate) | 44.6 ($M_n$ = 16,000, $M_w$ = 37,000) |
| Poly(2-hydroxyethyl methacrylate) | 37(dry), 69 (40 wt % water) |
| Poly(tetrafluoroethylene) | 23.9 (M = ∞) |
| Poly(dimethyl silane) | 20 |
| Poly(heptaisopropyl acrylate) | 14 |
| Poly(dodecyl or lauryl methacrylate) | 32.8 |
| Poly(DOPAM) | |
| The polymer contained in the film of Example 6 | 6.35 |
| The polymer contained in the film of Example 7 | 6.25 |

*Reference book: "Polymer Handbook", 3$^{rd}$ Edition, John Wiley & Son, Inc, 1989.

Referring to Table 3, FIG. 12a, and FIG. 12b, it is confirmed that the polymers contained in the films of Examples 6 and 7 have a lower critical surface tension than any other known polymers. Such results confirm that the polymers of the present invention have excellent water repellency.

What is claimed is:

1. A polymeric water repellent material comprising an acrylamide polymer including at least one repeating unit of Chemical Formula 1,
    wherein the acrylamide polymer has a plurality of pores having a diameter of 2.0 to 10.0 nm, and
    wherein the polymeric water repellant material has a contact angle between 90° to 170° when a water drop having a weight of 3 to 20 mg is dropped onto the polymeric water repellent material:

[Chemical Formula 1]

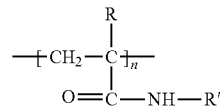

in Chemical Formula 1,
n is an integer of 15 to 1800,
R is hydrogen or methyl,
R' is X,

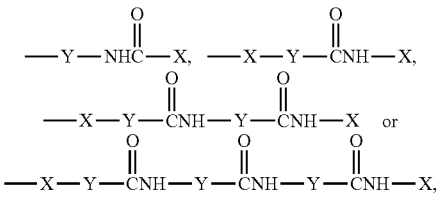

X is —Z—R",
Y is an alkylene of $C_1$ to $C_{10}$,
Z is an arylene of $C_6$ to $C_{20}$, and
R" is a linear or branched hydrocarbon of $C_{10}$ to $C_{20}$, or a linear or branched perfluorohydrocarbon of $C_{10}$ to $C_{20}$.

2. The polymeric water repellent material in accordance with claim 1, wherein the acrylamide polymer has a number average molecular weight of 5,000 to 500,000.

3. The polymeric water repellent material in accordance with claim 1, wherein the polymeric water repellent material comprises a film comprising the acrylamide polymer.

4. The polymeric water repellent material in accordance with claim 3, wherein the film has a thickness of 100 nm to 300 μm.

5. The polymeric water repellent material in accordance with claim 1, wherein the polymeric water repellent material comprises an electrospun fiber comprising the acrylamide polymer.

6. The polymeric water repellent material in accordance with claim 5, wherein the electrospun fiber has a plurality of pores having a diameter of 2 to 500 nm formed on its surface.

7. The polymeric water repellent material in accordance with claim 5, wherein the electrospun fiber has a fiber diameter of 200 nm to 10 μm.

8. The polymeric water repellent material in accordance with claim 5, wherein the electrospun fiber is surface-crosslinked with an acrylate crosslinker having at least two functional groups.

9. The polymeric water repellent material in accordance with claim 8, wherein the acrylate crosslinker having at least two functional groups is bisphenol A ethoxylate diacrylate of Chemical Formula 4:

[Chemical Formula 4]

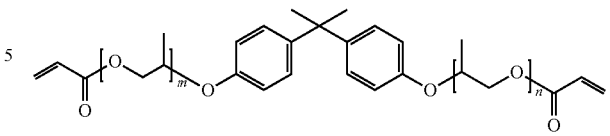

wherein m+n is an integer of 4 to 20.

10. The polymeric water repellent material in accordance with claim 1, wherein the polymeric water repellent material has a critical surface tension ($\gamma c$) of 10 dyne/cm or less.

11. The polymeric water repellent material in accordance with claim 1, wherein the polymeric water repellent material has water adhesiveness such that a water drop being dropped onto the surface of the water repellent material is held thereon for at least one second when the surface of the water repellent material is inclined at an angle up to 180°.

12. The polymeric water repellent material in accordance with claim 10, wherein the water repellent material has water adhesiveness such that a water drop being dropped onto the surface of the water repellent material is held thereon for at least one second when the surface of the water repellent material is inclined at an angle up to 180°.

* * * * *